Figure 1:
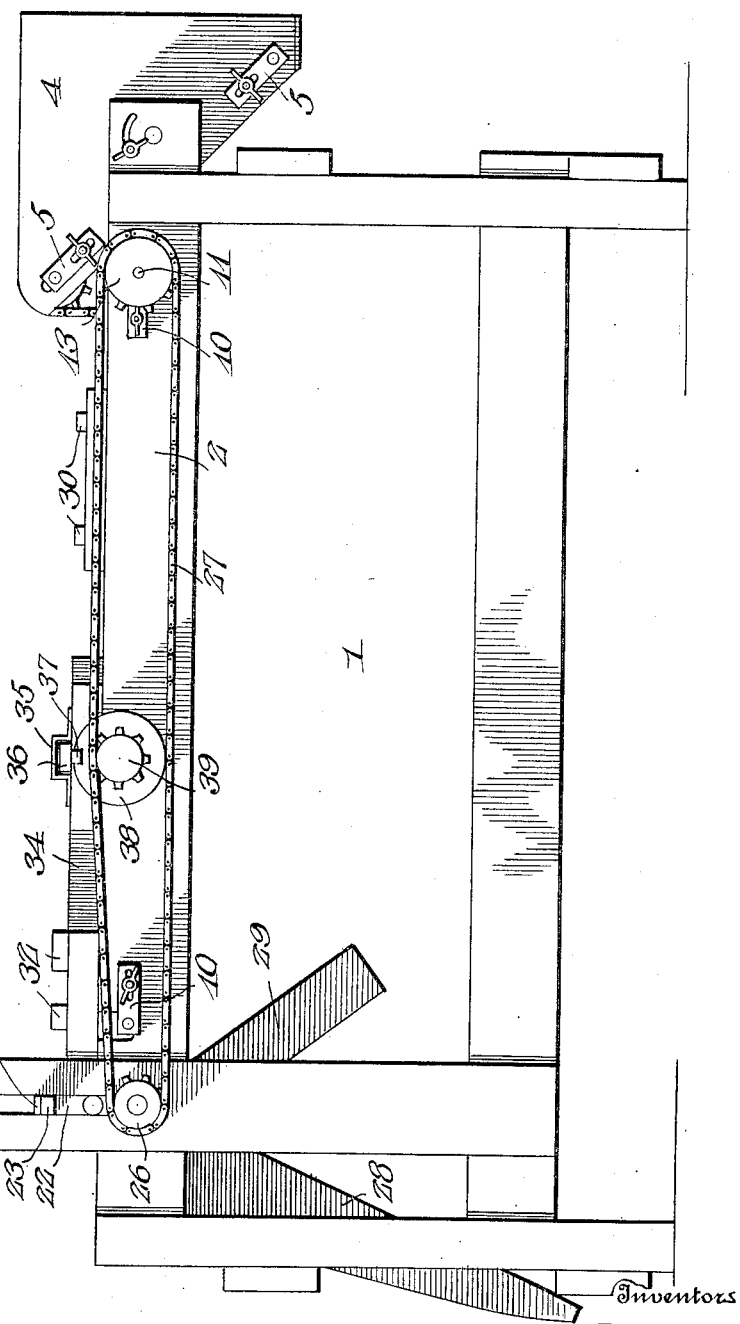

J. F. BULLARD & J. F. BULLARD.
BEAN SHELLER.
APPLICATION FILED DEC. 20, 1913.

1,108,691.

Patented Aug. 25, 1914.
3 SHEETS—SHEET 1.

Witnesses
Hugh H. Ott
K. Peacock

Inventors
John F. Bullard
Jay F. Bullard
By Victor J. Evans
Attorney

J. F. BULLARD & J. F. BULLARD.
BEAN SHELLER.
APPLICATION FILED DEC. 20, 1913.
1,108,691.
Patented Aug. 25, 1914.
3 SHEETS—SHEET 2.
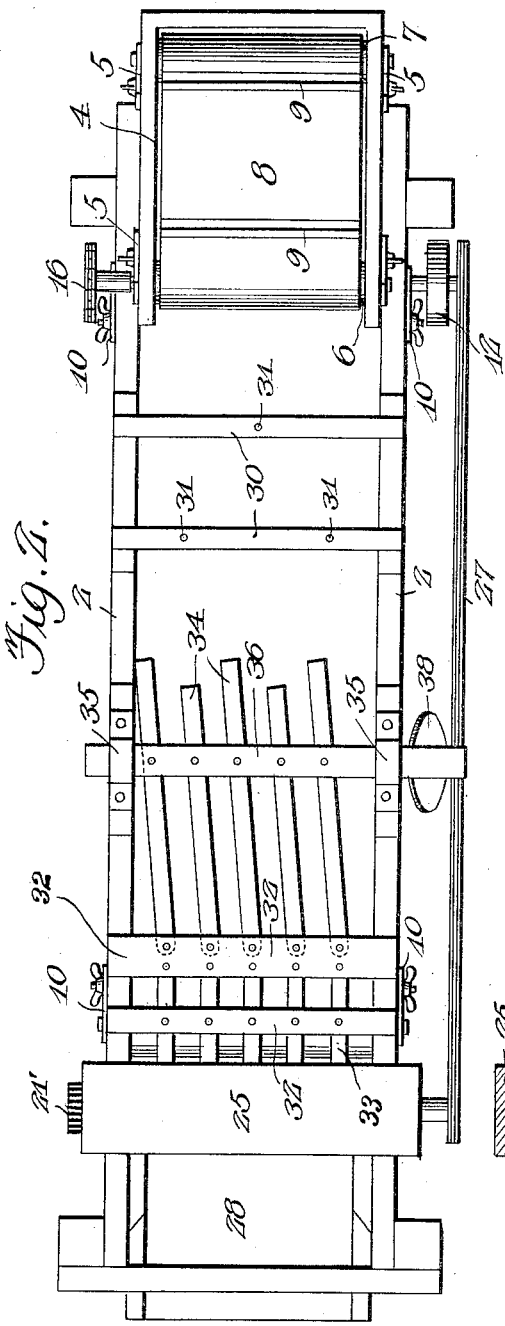
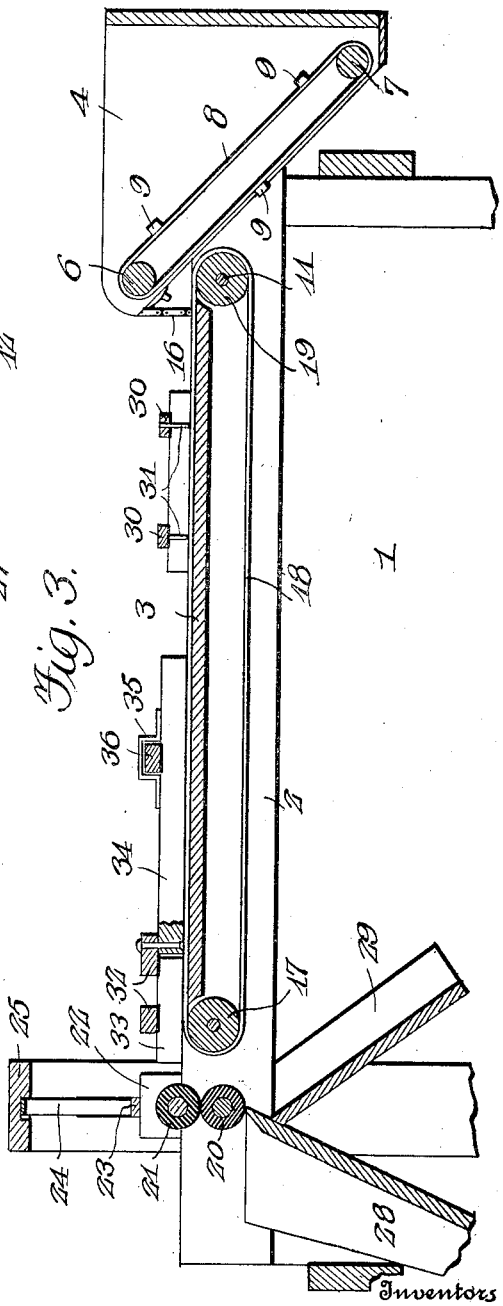
Witnesses
Hugh H. Ott
K. Peacock
Inventors
John F. Bullard
Jay F. Bullard
By Victor J. Evans
Attorney

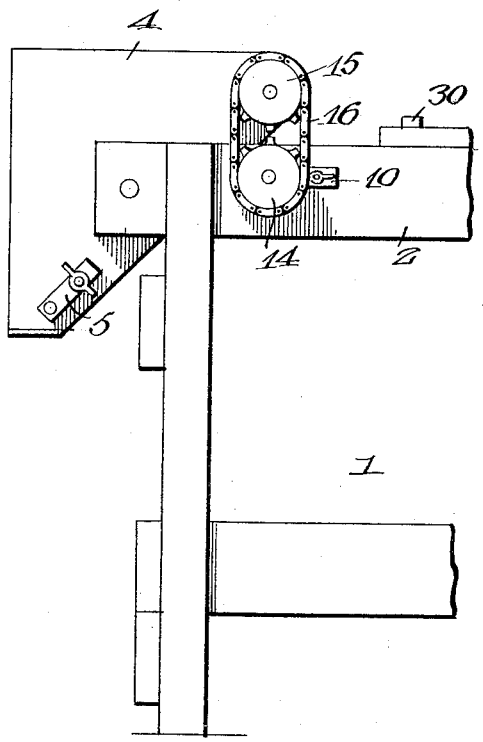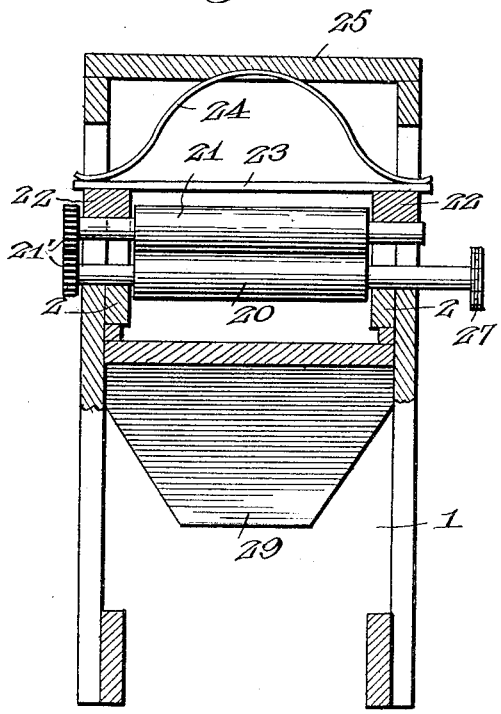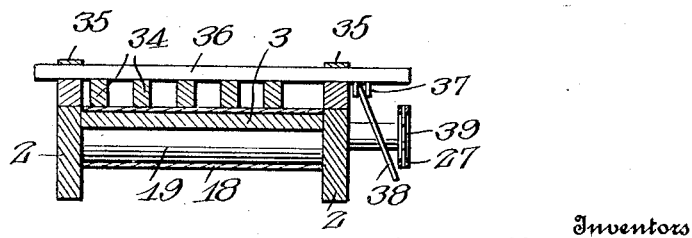

UNITED STATES PATENT OFFICE.

JOHN F. BULLARD AND JAY F. BULLARD, OF SWANTON, VERMONT.

BEAN-SHELLER.

1,108,691. Specification of Letters Patent. Patented Aug. 25, 1914.

Application filed December 20, 1913. Serial No. 808,019.

*To all whom it may concern:*

Be it known that we, JOHN F. BULLARD and JAY F. BULLARD, citizens of the United States, residing at Swanton, in the county of Franklin and State of Vermont, have invented new and useful Improvements in Bean-Shellers, of which the following is a specification.

This invention has relation to shellers especially adapted to be used for removing green beans from their pods and it consists in the novel features hereinafter described and claimed.

An object of the invention is to provide a machine or apparatus of the character indicated of simple structure and which is automatic in its action in removing the pods from the beans and separating the same.

With the above objects in view the apparatus comprises a frame having an endless belt mounted for orbital movement along the upper portion of the same and a hopper located upon the frame at one end of the belt. The said hopper is provided in its bottom with an endless belt upon which the beans in the pods are placed and the said belt moves the beans out of the hopper and deposits them upon the belt of the frame. At the delivery end of the belt which is mounted upon the frame is located a pair of soft rollers one of which is journaled in fixed bearings and the other in spring pressed bearings. Dividing chutes are located below the rollers and means is located above the upper run of the belt which is mounted upon the frame for causing the bean pods to assume positions approximately parallel with the line of movement of the belt as the said pods are presented to the said rollers.

In the accompanying drawings:—Figure 1 is a side elevation of the bean sheller. Fig. 2 is a top plan view of the same. Fig. 3 is a longitudinal sectional view of the same. Fig. 4 is a side elevation of an end portion of the sheller looking at the opposite side from that shown in Fig. 1. Fig. 5 is a transverse sectional view of one end portion of the sheller. Fig. 6 is a transverse sectional view of the upper portion of the sheller at a plane between the ends thereof.

The sheller comprises a frame 1 which includes upper side rails 2 between which is supported a top 3. A hopper 4 is pivotally mounted at one end of the frame 1 between the side rails 2 and is provided at its sides with adjustable bearings 5 in which are journaled the shafts of rollers 6 and 7. A belt 8 is trained around the rollers 6 and 7 and is provided at intervals with spaced slats or cleats 9. The rails 2 are provided at their sides with adjustable bearings 10 in two of which is journaled a shaft 11 said shaft being provided at one end with a pulley 12 and a sprocket wheel 13. At its other end the said shaft 11 is provided with a sprocket wheel 14 and the shaft of the uppermost roller 6 is provided with a sprocket wheel 15. A chain 16 is trained around the sprocket wheels 14 and 15 and is adapted to transmit rotary movement from the shaft 11 to the upper roller 6. The shaft 11 may be rotated by training a belt around the pulley 12 or any other suitable means may be employed for rotating the said shaft. The shaft of a roller 17 is journaled in the bearings 10 at the opposite ends of the rails 2 from the ends thereof at which the shaft 11 is located. An endless belt 18 is trained around the roller 17 and a roller 19 which is mounted upon the shaft 11. The upper run of the belt 18 is located above the top 3 and the lower run of the said belt is located below the said top.

The shaft of a roller 20 is journaled in fixed bearings adjacent the roller 17 and the shaft of a roller 21 is journaled in blocks 22 which are movably mounted above the bearings of the roller shaft 20. A cross bar 23 rests upon the upper sides of the blocks 22 and a spring 24 bears at its ends upon the end portions of the cross bar 23 and the intermediate portion of the said spring bears against the underside of a cross piece 25 supported upon the frame 1. The spring 24 is under tension with a tendency to hold the blocks 22 and the uppermost roller 21 toward the roller 20. The rollers 20 and 21 are of rubber or other suitable soft material. A sprocket wheel 26 is fixed to the shaft of the roller 20 and a sprocket chain 27 is trained around the sprocket wheel 13 and the sprocket wheel 26 and is adapted to transmit rotary movement from the shaft 11 to the roller 20. The shafts of the rollers 20 and 21 are operatively connected together by intermeshing gear wheels 21'.

A pod chute 28 is mounted upon the frame 1 and its upper end is located approximately below the centers of the rollers 20 and 21. A bean chute 29 is mounted upon the frame 1 and its upper end is just below the upper end of the pod chute 28. These chutes 28 and 29 diverge from each other from their upper to their lower ends. By adjusting the bearings 5 and 10 the belt 8 and 18 may be maintained at any desired degree of stretch or tension. Cross bars 30 are secured at their ends to the side rails 2 and extend transversely across the upper run of the belt 18 and are spaced therefrom. The said cross bars are provided at their under sides with downwardly disposed pins 31 which are adapted to encounter the bean pods as they are carried under the cross bars by the upper run of the belt 18 and which have a tendency to position the said pods upon the upper run of the belt with the long dimension of the pods approximately parallel with the line of movement of the belt. Cross bars 32 are also connected at their ends with the side rails 2 in the vicinity of the rollers 20 and 21. Parallel bars 33 are fixed at their ends to the cross bars 32 and are disposed above the upper run of the belt 18. Bars 34 are pivoted at one end to the innermost cross bar 32 at the ends of the parallel bars 33 and the free end portions of the bars 34 are disposed toward the cross bars 30. The bars 34 are of different lengths each alternate bar is shorter than the intervening bars as shown in Fig. 2 of the drawings. Guides 35 are mounted upon the side rails 2 in the vicinity of the free ends of the pivoted bars 34 and a cross bar 36 is slidably mounted in the guides 35. The said cross bar 36 is pivotally connected with each of the bars 34. The cross bar 36 is provided at its under side and at one end with spaced lugs 37 which receive the peripheral portion of a spiral cam 38 mounted on a sprocket wheel 39 journaled at one of the side rails 2. The teeth of the sprocket wheel 39 engage the links of the chain 16 at one of the runs thereof.

In operation the pods containing the beans are deposited in the hopper 4 and the said hopper is swung upon its pivotal support so that the belt 8 thereof is at a desired pitch with relation to a horizontal. Inasmuch as the said belt is moving when the shaft 11 is rotated as hereinbefore described the beans are carried by the upper run of the belt 18 up to the upper edge of the said hopper and are deposited upon the upper run of the belt 18. As the beans encounter the pins 31 they are partially straightened or positioned with their long dimensions in alinement with the line of travel of the upper run of the belt 18. As the pods approach the pivoted bars 34 the free end portions of the said bars are swung transversely of the upper run of the belt 18 by the action of the spiral cam 38 engaging the lugs 37 of the cross bar 36. Thus the bean pods are received endwise between the said bars 34 and the transverse movement of the said bars accurately brings the long dimensions of the bean pods in alinement with the line of travel of the belt 18 and said bean pods are passed endwise between the fixed parallel bars 33. From the parallel bars 33 the bean pods are carried between the rollers 20 and 21 and the said rollers crush the pods and squeeze the beans out of the same. The pods are carried through the rollers and deposited in the pod chute 28 while the beans fall into the bean chute 29 and may be directed into a suitable receptacle provided for their reception.

It will therefore be seen that a machine or apparatus of simple structure is provided for quickly and efficiently shelling beans and that the parts coöperate with each other in a manner to effect the shelling operation without the attention of an operator or attendant.

Having described the invention what is claimed is:—

1. A bean sheller comprising a frame, a belt mounted for orbital movement upon the frame, bean shelling elements located at the delivery end of the belt, bars pivotally mounted above the upper run of the belt and means for swinging the said bars simultaneously in a direction transversely of the line of movement of the belt.

2. A bean sheller comprising a frame, a belt mounted for orbital movement upon the frame, bean shelling elements located at the delivery end of the belt, fixed bars located above the upper run of the belt, bars pivotally mounted at the ends of said fixed bars and means for swinging the free end portions of the said pivoted bars transversely of the line of movement of the belt.

3. A bean sheller comprising a frame, a belt mounted for orbital movement upon the frame, bean shelling elements located at the delivery end of the belt, bars pivotally supported above the upper run of the belt, means for swinging the said bars simultaneously transversely of the line of movement of the belt and pins supported above the upper run of the belt in advance of the free ends of the said pivoted bars.

4. A bean sheller comprising a frame, a belt mounted for orbital movement upon the frame, bean shelling elements located at the delivery end of the belt, bars pivotally mounted above the upper run of the belt, means for swinging the free end portions of the said bars simultaneously transversely of the line of movement of the belt, said bars being of different lengths, each alternate bar being shorter than the intervening bars.

5. A bean sheller comprising a frame, a belt mounted for orbital movement along the frame, bean shelling elements located at the delivery end of the belt, bars pivoted above the upper run of the belt, a cross bar pivotally connecting said pivoted bars together and provided with spaced lugs, a wheel journaled upon the frame and having a spiral cam which is received between the said lugs.

6. A bean sheller comprising a frame, rollers journaled at the opposite ends of the frame, a belt trained around the rollers, said frame having a top which is positioned under the upper run of the belt, means for rotating one of the rollers, a hopper mounted upon the frame adjacent the last mentioned roller, a belt mounted for orbital movement in the hopper, means for operating the belt in the hopper from the last mentioned roller, bean shelling rollers journaled for rotation at the delivery end of the belt, means for operating the last mentioned rollers from the roller which operates the belt in the hopper, bars pivoted above the upper run of the belt, a transverse bar pivoted to the first mentioned bars and having spaced lugs, a wheel journaled upon the sides of the frame and having a spiral cam which is received between the lugs and means for rotating the said wheel.

In testimony whereof we affix our signatures in presence of two witnesses.

JOHN F. BULLARD.
JAY F. BULLARD.

Witnesses:
  WASH KEENAN,
  GEO. L. LOISELLE.

Copies of this patent may be obtained for five cents each, by addressing the "Commissioner of Patents, Washington, D. C."